US008886170B2

(12) United States Patent
Roth et al.

(10) Patent No.: US 8,886,170 B2
(45) Date of Patent: *Nov. 11, 2014

(54) SYSTEMS AND METHODS FOR MANAGING SERVICES FOR CARRIER SUBSCRIBERS AND MIGRATING THEM TO SERVICE BUNDLES

(75) Inventors: Ronald Roth, Waterloo (CA); Cynthia Taylor, Waterloo (CA); Jia-Lin Chin, Waterloo (CA)

(73) Assignee: BlackBerry Limited, Waterloo (CA)

( * ) Notice: Subject to any disclaimer, the term of this patent is extended or adjusted under 35 U.S.C. 154(b) by 92 days.

This patent is subject to a terminal disclaimer.

(21) Appl. No.: 13/308,135

(22) Filed: Nov. 30, 2011

(65) Prior Publication Data

US 2012/0093305 A1 Apr. 19, 2012

Related U.S. Application Data

(63) Continuation of application No. 11/944,452, filed on Nov. 22, 2007, now Pat. No. 8,090,354.

(60) Provisional application No. 60/867,122, filed on Nov. 23, 2006, provisional application No. 60/867,124, filed on Nov. 23, 2006.

(51) Int. Cl.
 *H04M 3/42* (2006.01)
(52) U.S. Cl.
 CPC .................................. *H04M 3/42144* (2013.01)
 USPC ........ 455/414.1; 455/405; 455/406; 455/407; 455/408; 455/409; 455/418; 709/217; 709/218; 709/219

(58) Field of Classification Search
 CPC .............. H04L 67/306; H04L 12/5695; H04L 41/0896; H04L 12/189; H04L 47/70; H04L 47/805; H04M 3/42; H04M 3/42365; H04M 3/42374; H04W 12/08; G06F 21/604
 USPC .............. 455/414.1, 405, 406, 407, 408, 409, 455/418; 709/217, 218, 219
 See application file for complete search history.

(56) References Cited

U.S. PATENT DOCUMENTS

| 7,062,269 | B2 | 6/2006 | Albertsson et al. |
| 7,103,351 | B2 * | 9/2006 | Chaudhari et al. .......... 455/414.1 |
| 7,127,386 | B2 | 10/2006 | Mocek et al. |
| 2008/0071813 | A1 * | 3/2008 | Nair et al. ..................... 707/101 |

OTHER PUBLICATIONS

Roth, et al., Systems and Methods for Managing Services for Carrier Subscribers and Migrating Them to Service Bundles, U.S. Appl. No. 11/944,452, filed Sep. 2, 2011.

(Continued)

*Primary Examiner* — Nimesh Patel
(74) *Attorney, Agent, or Firm* — Perry + Currier Inc.

(57) ABSTRACT

There is disclosed a system and method for managing service for carrier subscribers and migrating them to service bundles. In an embodiment, the method comprises obtaining a list of existing services to which a subscriber is subscribed; comparing the list of services to available service bundles; and determining if there is an exact match of services between the list of existing services and services included in one or more available service bundles, and if so, migrating the subscriber to the one or more available service bundles with the exact match. A subscriber may be manually migrated if migration is not possible with an exact match or partial match.

12 Claims, 6 Drawing Sheets

(56) References Cited

OTHER PUBLICATIONS

Corresponding European Patent Application No. 07121364.9 Summons to Attend Oral Proceedings dated Feb. 26, 2013.
Kristina Heinonen et al. "Classifying Mobile Services" Proceedings of Helsinki Mobility Roundtable, Jan. 1, 2006, XP 55052752.
"New Blackberry Internet Service Packages and Subscription Codes", Oct. 29, 2011; XP55052719, Retrieved from the Internet: URL:http://dekokoblob.com.ng/2011/10/mtn-nigeria-new-blackberry-internet.html [retrieved on Feb. 7, 2013].
Corresponding Canadian Patent Application No. 2611466 Examination Report dated Jul. 30, 2013.

* cited by examiner

SYSTEMS AND METHODS FOR MANAGING SERVICES FOR CARRIER SUBSCRIBERS AND MIGRATING THEM TO SERVICE BUNDLES

RELATED APPLICATION INFORMATION

This is a continuation of U.S. patent application Ser. No. 11/944,452, filed Nov. 22, 2007, which claims priority from U.S. Provisional Patent Application Nos. 60/867,122, and 60/867,124 filed Nov. 23, 2006, the contents of each which are incorporated herein by reference in their entirety.

FIELD OF THE INVENTION

The present invention relates generally to systems and methods for managing services for carrier subscribers and migrating them to service bundles.

BACKGROUND

From time-to-time, suppliers of communication services may introduce new services that may be offered to subscribers of various carriers. Such services may include, for example, electronic mail (email), voice communications, instant text messaging, Internet browsing, music downloading, and various services that may become available with the introduction of a new communication device.

As each new service is offered, the list of services being subscribed to by each subscriber may need to be updated and maintained. In some cases, a carrier may have to update perhaps tens of thousands or even hundreds of thousands of subscribers with the new service, making the provisioning of the new service time consuming and logistically challenging. In certain cases, the new service may be a base level upgrade that the carrier wishes to roll out to its entire subscriber base. Such service updates may then become impossible to manage manually.

What is needed are systems and methods that may overcome some of these challenges.

DETAILED DESCRIPTION

As noted above, the present invention relates to systems and methods for managing services for carrier subscribers and migrating them to service bundles.

Figure 1:
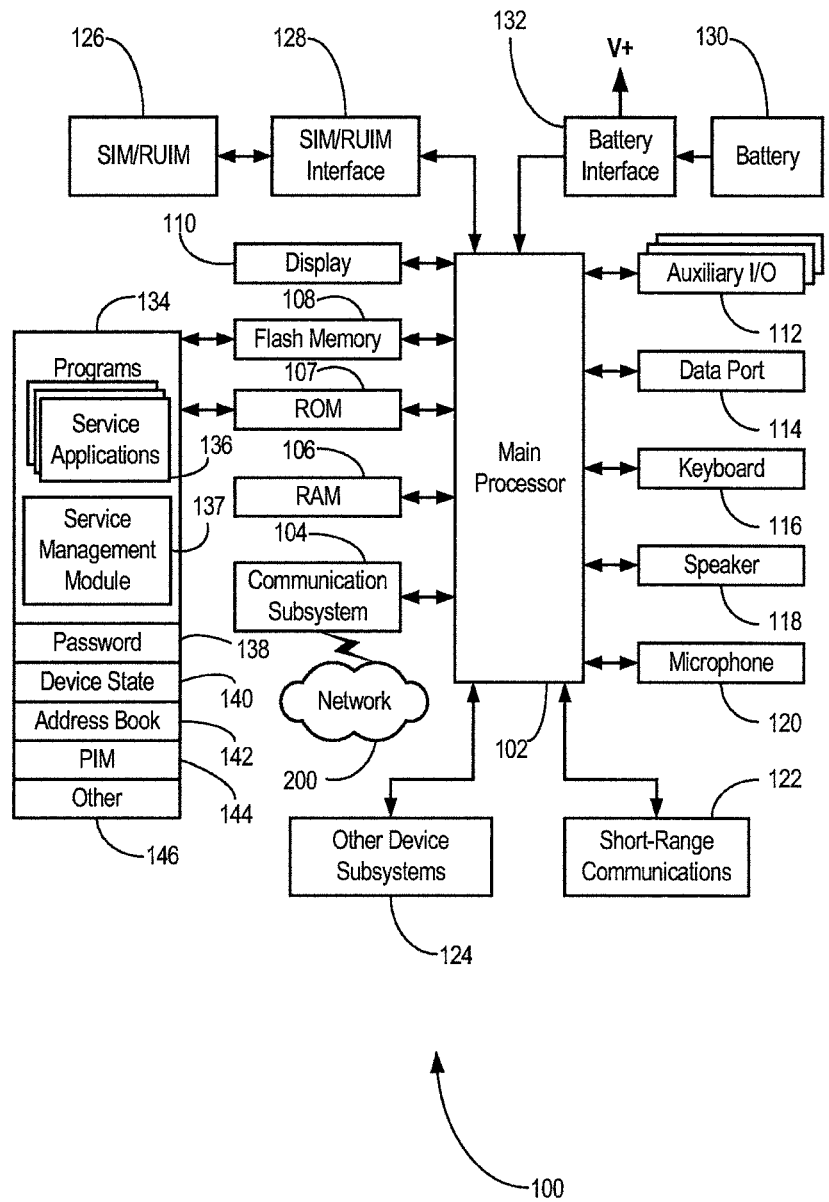
FIG. 1 is an illustration of a device in accordance with an embodiment.

Shown in FIG. 1 is a schematic block diagram of an illustrative mobile handheld device 100. The handheld device 100 may comprise a number of components, including a main processor 102 which controls the overall operation of device 100. Various communication functions, including data and voice communications, Internet browsing, instant text messaging, etc. may be performed through a communication subsystem 104 via wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a speaker 118, a microphone 120, short-range communications 122 and other device subsystems 124. The device 100 may be a battery-powered device and may include a battery interface 132 for receiving one or more rechargeable batteries 130 and for powering the various subsystems described above.

Operating system software used by the main processor 102 is typically stored in a persistent store such as flash memory 108. Those skilled in the art will appreciate that the operating system, specific device applications, or parts thereof, may be temporarily loaded into a volatile store such as the RAM 106.

Handheld device 100 may also include a read-only memory (ROM) 107 that may store a non-alterable electronic serial number or ESN which may be burned into ROM 107 at the time of manufacture of device 100. In addition, handheld device 100 may have a unique product identification number (PIN) stored in the ROM 107, or in another memory store in device 100.

The main processor 102, in addition to its operating system functions, enables execution of software applications 134 on the device 100. The software applications 134 may control various device features and services, and may be installed on the device 100 during its manufacture, or may be subsequently loaded onto the device 100 as a software update through one of the wireless network 200, the auxiliary I/O subsystem 112, the data port 114, the short-range communications subsystem 122, or another subsystem 124.

The software applications 134 may include, for example, various communication service modules 136 (e.g. email, instant text messaging, Internet browsing, music downloading, etc.), and a password approval module 138. The software applications 134 may also include a device service management module 137 for managing the service applications provisioned for device 100 on a carrier network.

The handheld device 100 may further include a device state module 140, an address book 142, a personal information manager (PIM) 144, and various other modules 146.

Figure 2:
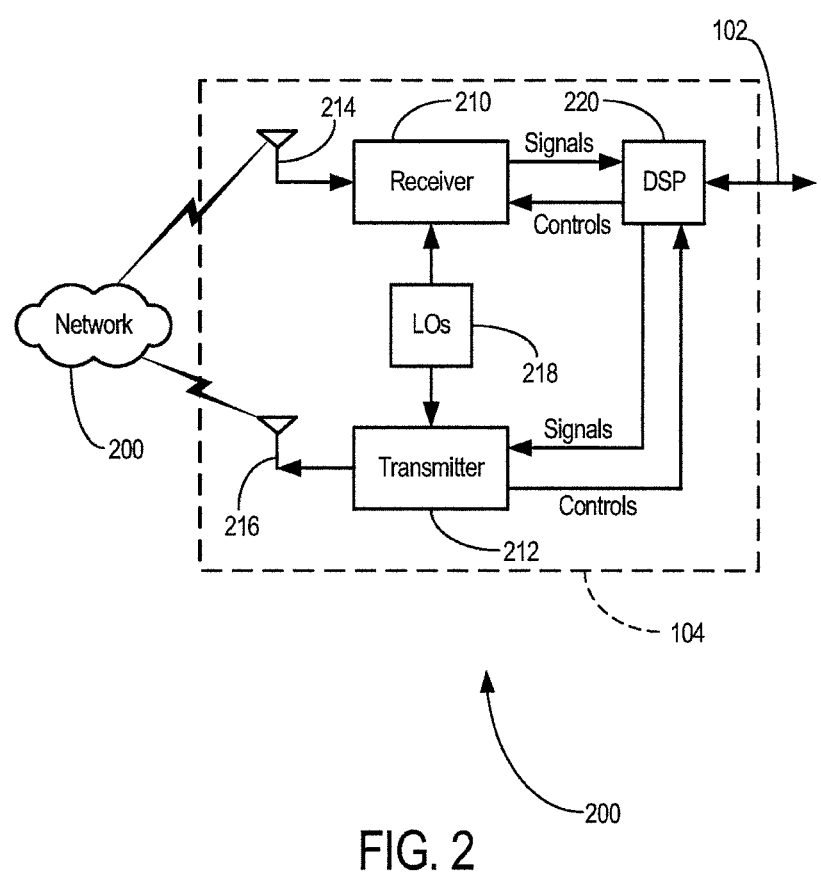
FIG. 2 is a schematic block diagram of a communication subsystem component in the device of FIG. 1.

Referring now to FIG. 2, a block diagram of the communication subsystem component 104 of FIG. 1 is shown. The communication subsystem 104 may comprise a receiver 210 and a transmitter 212, as well as associated components such as one or more embedded or internal antenna elements 214, 216, Local Oscillators (LOs) 218, and a processing module such as a Digital Signal Processor (DSP) 220.

Signals received by the antenna 214 through the wireless network 200 are input to the receiver 210, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 220. In a similar manner, signals to be transmitted are processed, including modulation and encoding, by the DSP 220. These DSP-processed signals are input to the transmitter 212 for digital-to-analog (D/A) conversion, frequency up conversion, filtering, amplification and transmission over the wireless network 200 via the antenna 216.

Figure 3:
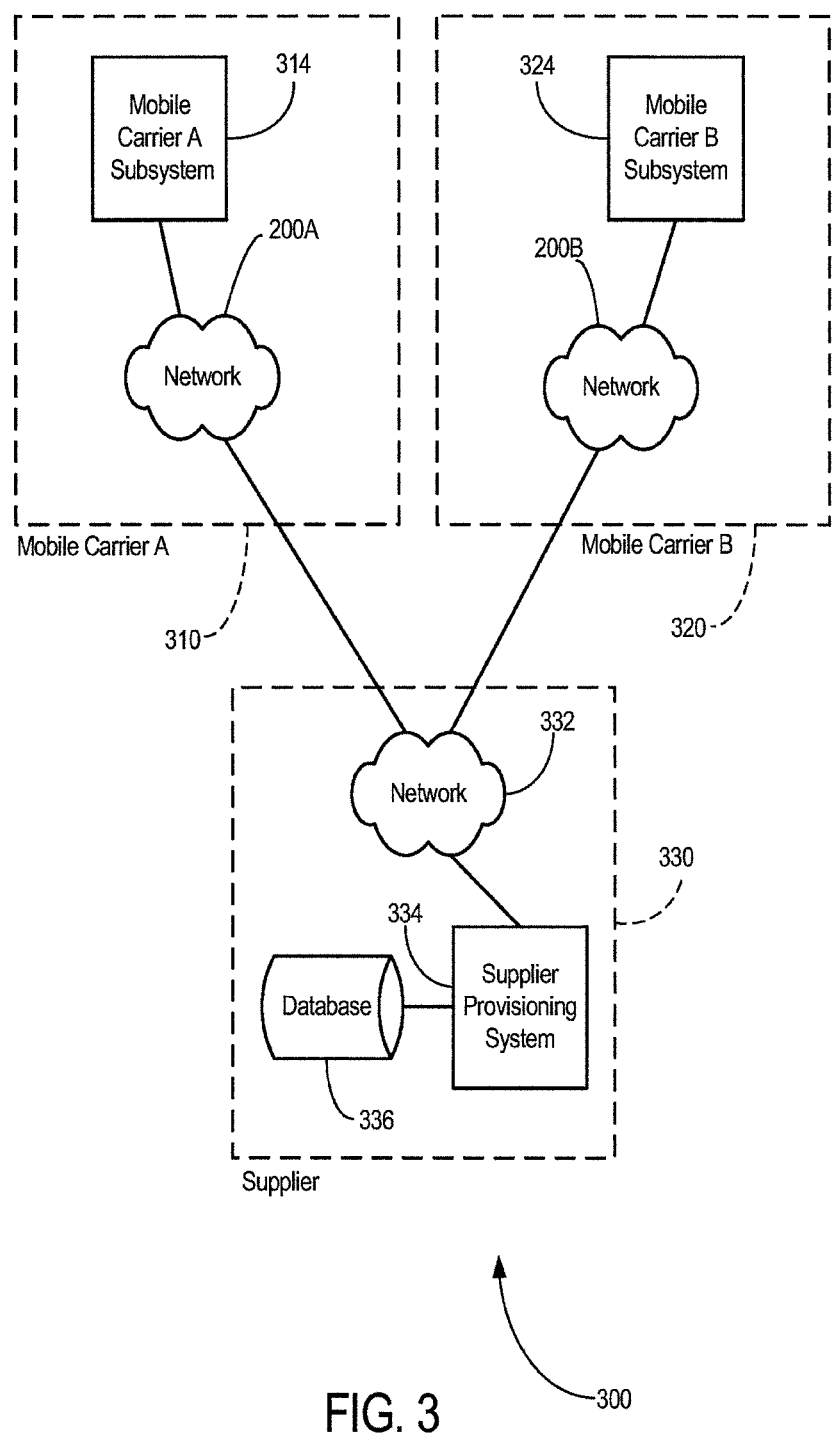
FIG. 3 is a schematic block diagram of a system in accordance with an embodiment.

Now referring to FIG. 3, shown is an illustrative schematic block diagram of wireless networks 200A, 200B of mobile carrier A 310 and mobile carrier B 320, respectively. With the various components and subsystems described above, device 100 may be configured to access various services available through wireless networks 200A and 200B. As shown, each of the wireless networks 200A, 200B may have subsystems 314, 324 for provisioning various wireless services for devices 100 on their respective wireless networks 310, 320. The supplier 330 may offer various communication services via network connections to the supplier 330's own network 332. The communication services may include, for example, wireless email, voice communication, instant text messaging, Internet browsing, music downloading, and various other services to subscribers on wireless networks 200A, 200B.

The supplier 330's network 332 may connect to a provisioning system 334 maintained by the supplier 330 and which may be appropriately configured to interact with subsystems 314, 324 provided on each of the wireless networks 200A, 200B. If connected through the Internet, for example, the connections between provisioning system 334 and subsystems 314, 324 may be by way of XML, or a web services interface. With a suitable network connection, subsystems 314 and 324 may be configured to interact with the supplier 330's provisioning system 334 to request activation, deactivation, suspension or modification of a subscriber's services on their respective wireless networks 200A, 200B.

In an embodiment, provisioning system 334 may maintain a database 336 of services that have been provisioned for each of the devices 100 on the wireless networks 200A, 200B of mobile carrier A 310, and mobile carrier B 320. In the database 336 of provisioning system 334, each of the devices 100 may be uniquely identified, for example, by the unique ESN burned into the ROM 107 of each device 100. Alternatively, each device 100 may be uniquely identified by the unique PIN identifier stored in ROM 107, or in another memory store in device 100. Records in database 336 may contain the unique ESN or PIN retrieved from ROM 107 or another memory store on each device 100. Each device 100 may thus be uniquely recognized by the supplier's provisioning system 334. Records in database 336 may also store information for the owning mobile carrier (e.g. mobile carrier A 310, or mobile carrier B 320), and this information may be linked to the unique ESN or PIN of device 100.

In an embodiment, each of the devices 100 may also have a unique billing identification (BID) based on the ESN or PIN. This information may also be stored in the database 336 of provisioning system 334. The database 336 of provisioning system 334 may also store for each device 100 information on various services that have been provisioned for that device (e.g. email, voice, Internet access, music downloading, etc.). Use of the various services which are subscribed to may be monitored by a subscriber's unique BID, and billed appropriately to the subscriber.

In an illustrative embodiment, each service available for subscription may be referenced by a property known as its XML name. In this case, subsystems 314 and 324 can request actions (e.g. activation, deactivation, suspension or modification) to be performed on specific services for a subscriber by referencing their XML names on the supplier 330's provisioning system 334.

As the supplier 330 adds and offers new communication services, the list of services being subscribed to and provisioned for each subscriber needs to be updated and maintained on the provisioning system 334 and each of the subsystems 314, 324. However, with many services offered and subscribed to, the number of records that must be maintained for each subscriber may become very large. Also, if any of the XML names are changed, discrepancies may be introduced over time between the supplier 330's provisioning system 334 and the carrier subsystems 314, 324 such that access to certain services may be inadvertently restricted. An improved system and method for managing these services is needed.

Thus, in accordance with the presently disclosed method and system, rather than maintaining a list of individual services and the status of each service for each subscriber, the supplier 330 may define a list of available service bundles such that each subscriber can be associated with a particular service bundle, rather than be associated with a long list of individual services. As will be explained in more detail further below, one of the services in a defined service bundle may be designated as a "main" service, and any actions (e.g. activation, deactivation, suspension or modification) taken in respect of this "main" service may also be applied to other services included in the service bundle. Consequently, the number of transactions needed to take action on subscribed services may be significantly reduced.

Each of mobile carrier A 310 and mobile carrier B 320 may then adopt a list of defined service bundles, which may be a subset of all possible service bundles defined by the supplier 330, from which to request provisioning of services to offer to its subscribers.

In an embodiment, a migration process may be used to migrate subscribers from an existing list of services to one of the newly defined service bundles. Before the migration, the XML name of the "main" service may be switched to point to an appropriately defined service bundle including the "main" service. This way, any new activation request from carrier subsystems 314, 324 may result in the bundle service being activated, and not the services individually. For other actions such as deactivation, suspension, or modification, the supplier 330's provisioning system 334 may be configured to adapt to the existing service profile of the subscriber, as explained below. An illustrative example of a subscriber migration process will now be described.

Figure 4A:
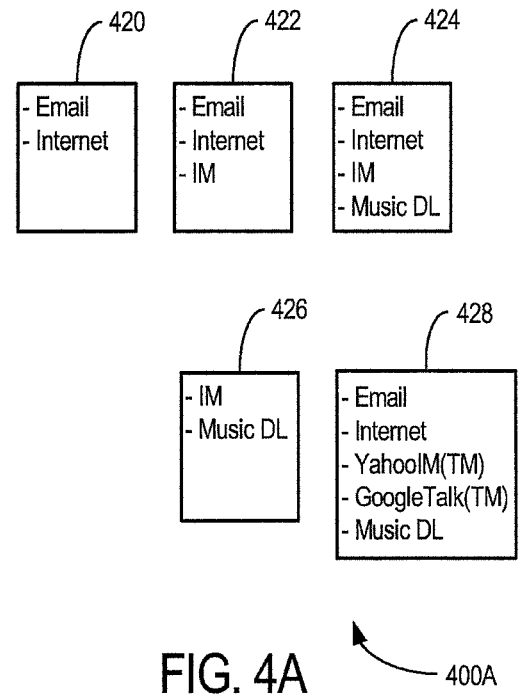
FIGS. 4A and 4B are schematic block diagrams of various defined service bundles in accordance with an embodiment.
Figure 4B:
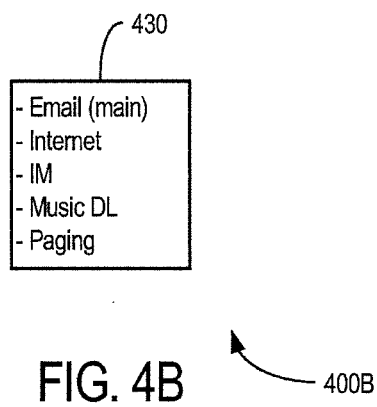

Now referring to FIGS. 4A and 4B, shown are illustrative examples of service bundles defined by a supplier 330 in its provisioning system 334, and adopted by carriers on their subsystems 314, 324. In an embodiment, each subscriber of mobile carrier A 310 and mobile carrier B 320 may have an existing service profile—that is, the list of services to which the subscriber is currently subscribed, or has been subscribed to in the past. In this case, a possible migration strategy is to choose an appropriate service bundle for each subscriber, based on the subscriber's existing service profile and the list of service bundles made available to the subscriber by a carrier 310, 320.

As shown in FIGS. 4A and 4B, migration may be accomplished by locating an "exact match", or a "partial match". For example, in FIG. 4A, an "exact match" migration is shown where a subscriber's existing list of active services is matched exactly to one or more of the carrier's available service bundles. For example, a subscriber's existing list of services may include wireless email, voice communication, instant text messaging, Internet browsing, and music downloading.

Still referring to FIG. 4A, one of the supplier defined service bundles 420 offered by mobile carrier A 310 may include, for example, email and Internet browsing. Another service bundle 422 offered by mobile carrier A 310 may include email and Internet browsing plus instant text messaging. Yet another service bundle 424 offered by mobile carrier A 310 may include email, Internet browsing, instant text messaging, and music downloading. Based on these options, the subscriber may be migrated to service bundle 424 to exactly match the subscriber's existing list of services.

In other cases, there may not be a defined service bundle which includes all of the services. Instead, it may be necessary to combine two or more service bundles to allow a subscriber to migrate to defined service bundles. For example, if service bundle 424 is not an available service bundle, the next best match is service bundle 422 with three of the four services. If music downloading is available as a separate, individual service, the subscriber may then be migrated to service bundle 422 plus the individual music downloading service. In this case, the number of necessary transactions is still reduced.

As another example, suppose that mobile carrier A 310 did not offer service bundle 424, but instead offered service bundle 426 including instant text messaging and music downloading. In this case, the subscriber may be migrated to non-overlapping service bundles 420 and 426. While more than one service bundle may be needed to migrate a subscriber in this case, the records and corresponding transactions necessary to manage the services is still significantly reduced.

In another example, there may be two or more service bundles with some overlapping services. For example, instead of service bundle 426, mobile carrier A 310 may offer service bundle 428 including email, Internet browsing, music downloading, and instant text messaging from two or more possible text messaging applications (e.g. YahooIM™, and GoogleTalk™). In this case, the subscriber may be migrated to service bundle 428, as it may offer a larger bundle of services matching the existing list of services.

Now referring to FIG. 4B, shown is an illustrative example of a "partial match" migration, in which a subscriber need match only one or more "main" services in the service profile. In one embodiment, a "main" service may be defined as a service that is chargeable, and other services not designated as a "main" service may not be chargeable individually. For example, given a subscriber with existing services including email, Internet browsing, instant text messaging, and music downloading, email may be designated as a "main" service which must be matched to a "main" email service in one of the service bundles defined by supplier 330. In this case, the target service bundle must also include that email service as the "main" service in that bundle. Thus, for example, if a service bundle 430 includes email, Internet browsing, instant text messaging, music downloading, and paging, and the email service is defined as the "main" service in service bundle 438, then the subscriber may be migrated to the new service bundle 430, even though it does not exactly match the subscriber's existing list of services. Here, the paging service may be, for example, an additional feature included in service bundle 430 which does not cost the subscriber any additional subscription fees. In this case, the fact that the service bundle does not match exactly does not make a difference. Therefore, the subscriber may be migrated based on the partial match of at least one "main" chargeable service.

As it is expected that most subscribers may be migrated using the "exact match" process described earlier, a relatively smaller number of subscribers may need to be migrated using the "partial match" process.

Finally, if there is a situation in which a subscriber has an unusual set of existing services, and it is not possible to migrate the subscriber using one of the "exact match" and "partial match" processes described above, then it may be necessary to manually migrate the subscriber. For example, a new service bundle may be defined including all of the existing services for a subscriber, or a new service bundle may be defined that may be combined with one or more service bundles to provide coverage for all of the existing services.

Figure 5:
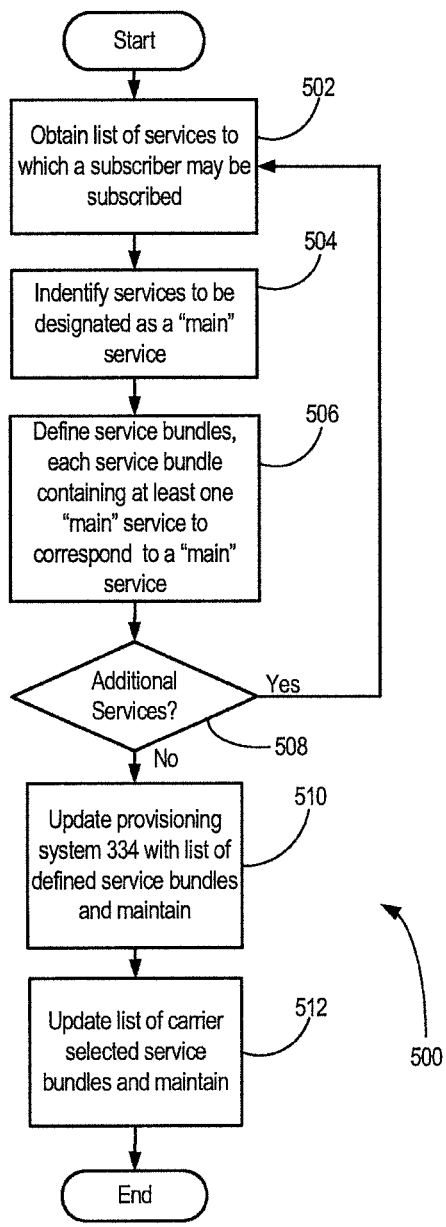
FIG. 5 is an illustrative flowchart of a method in accordance with an embodiment.

Now referring to FIG. 5, shown is an illustrative method for managing services for carrier subscribers in accordance with an embodiment. As shown, method 500 begins at block 502, and obtains a list of services to which a subscriber may be subscribed. Method 500 then proceeds to block 504, where method 500 identifies services to be designated as a "main" service. In an embodiment, a "main" service is a service in which any action taken on that "main" service is also applied to other services that are bundled together with it. The "main" service is typically a chargeable service, as previously described.

Method 500 then proceeds to block 506, where method 500 may define service bundles, each service bundle containing at least one "main" service to correspond to a "main" service as identified above. As many service bundles as necessary may be defined at block 506, such that a subscriber with a "main" service may have a corresponding defined service bundle to migrate to. Also, a "main" service may be included in many service bundles in various combinations with other services.

Method 500 then proceeds to decision block 508, where method 500 determines if there are additional services to process. If yes, method 500 returns to block 502 and repeats. If no, method 500 proceeds to block 510, where method 500 updates the supplier's provisioning system (e.g. provisioning system 334) with available service bundles and maintains a database of the available service bundles. Method 500 then proceeds to block 512, where method 500 updates the carrier subsystems (e.g. carrier subsystems 314, 324) where a set or subset of the available service bundles in maintained in a database. Method 500 then ends.

Figure 6:
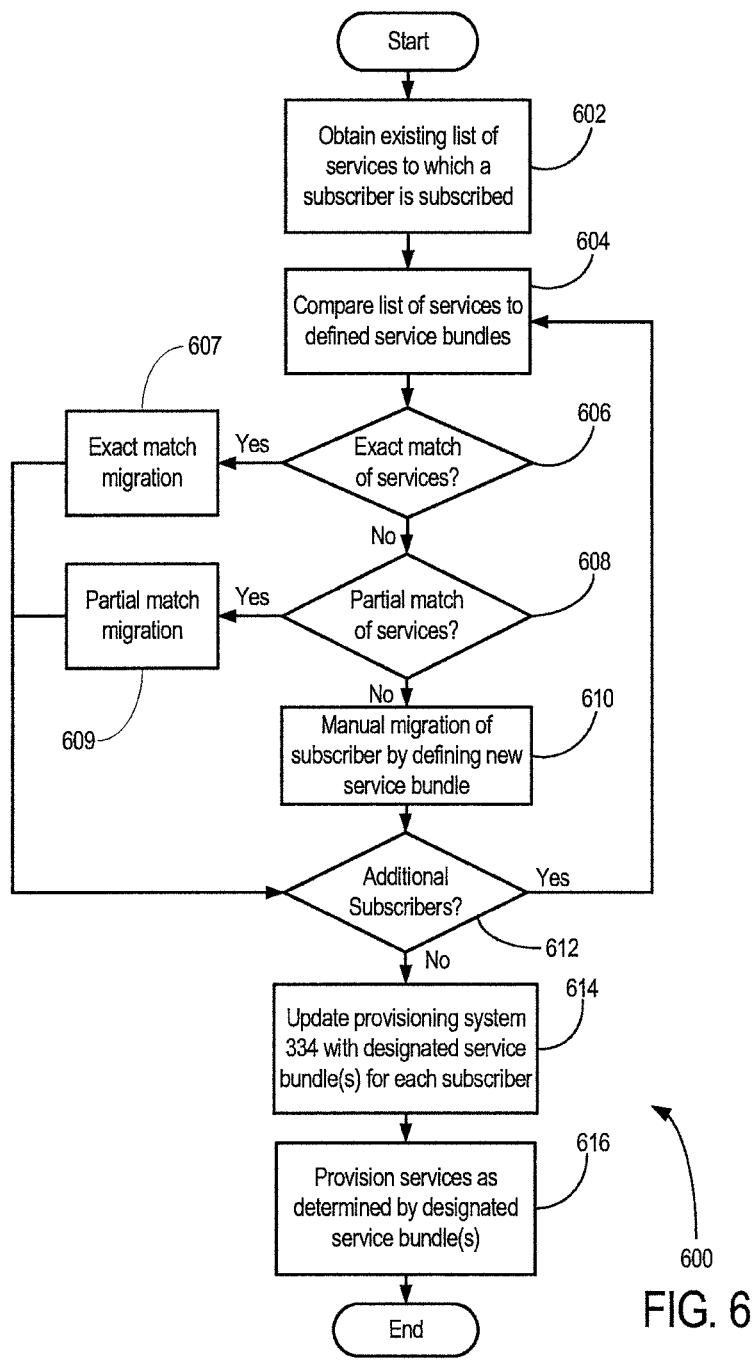
FIG. 6 is an illustrative flowchart of another method in accordance with an embodiment.

Now referring to FIG. 6, shown is an illustrative method 600 for migrating in accordance with an embodiment. As shown, method 600 begins at block 602, and obtains an existing list of services to which a subscriber is subscribed. Method 600 then proceeds to block 604, where method 600 compares the list of services to available service bundles (e.g. as selected by a carrier 310, 320 from the full list of service bundles defined by supplier 330). Method 600 then proceeds to decision block 606 to determine if there is an exact match of services between the existing list and one or more of the defined service bundles. If yes, method 600 proceeds to block 607, where method 600 proceeds to migrate the subscriber using exact match migration (as described above with respect to FIG. 4A). Method 600 then proceeds to decision block 612.

If no, method 600 proceeds to decision block 608, where method 600 determines if there is a partial match of services between the existing list and one or more of the defined service bundles. If yes, method 600 proceeds to block 609, where method 600 proceeds to migrate the subscriber using partial match migration (as described above with respect to FIG. 4B).

If the subscriber could not be migrated with exact match migration at decision block 606 or partial match migration at decision block 608, method 600 proceeds to block 610 where method 600 proceeds with manual migration of a subscriber by selecting the nearest matching service bundle, or by defining a new service bundle as may be necessary. Method 600 then proceeds to decision block 612.

At decision block 612, method 600 determines if there are additional subscribers. If yes, method 600 returns to block 604, and repeats. If no, method 600 proceeds to decision block 614, where method 600 updates the supplier's provisioning system (e.g. provisioning system 334), and the carrier subsystems (e.g. carrier subsystems 314, 324) with the service bundles to which a subscriber has been migrated. Method 600 then proceeds to block 616, where method 600 may provision services according to the designated service bundle or bundles. Method 600 then ends.

As will be appreciated, with the above system and method, subscribers may be efficiently migrated to service bundles such that subsequent management of individual services for each subscriber is made significantly more efficient.

In another aspect, there is provided a method of migrating carrier subscribers to service bundles, comprising: obtaining a list of existing services to which a subscriber is subscribed; comparing the list of services to available service bundles; determining if there is an exact match of services between the list of existing services and services included in one or more available service bundles, and if so, migrating the subscriber to the one or more available service bundles with the exact match.

In an embodiment, the method further comprises: identifying a main service in the list of existing services; determining if there is a partial match of services between the main service and a service included in one or more available service bundles, and if so, migrating the subscriber to the one or more available service bundles with the partial match.

In another embodiment, the method further comprises defining a new service bundle if a subscriber cannot be migrated with an exact match or a partial match.

In another embodiment, the method further comprises maintaining a supplier provisioning system database with assigned service bundle information for each subscriber.

In another embodiment, the method further comprises maintaining in the supplier provisioning system database the available service bundles for each carrier.

In another embodiment, the method further comprises provisioning services for each subscriber as determined by the subscriber's carrier's available service bundle.

In another aspect, there is provided a system for migrating carrier subscribers to service bundles, comprising: means for obtaining a list of existing services to which a subscriber is subscribed; means for comparing the list of services to available service bundles; means for determining if there is an exact match of services between the list of existing services and services included in one or more available service bundles, and if so, migrating the subscriber to the one or more available service bundles with the exact match.

In an embodiment, the system further comprises: means for identifying a main service in the list of existing services; means for determining if there is a partial match of services between the main service and a service included in one or more available service bundles, and if so, migrating the subscriber to the one or more available service bundles with the partial match.

In another embodiment, the system further comprises means for defining a new service bundle if a subscriber cannot be migrated with an exact match or a partial match.

In another embodiment, the system further comprises means for maintaining a supplier provisioning system database with assigned service bundle information for each subscriber.

In another embodiment, the system further comprises means for maintaining in the supplier provisioning system database the available service bundles for each carrier.

In another embodiment, the system further comprises means for provisioning services for each subscriber as determined by the subscriber's carrier's available service bundle.

In another aspect, there is provided a computer readable medium storing computer code that when processed adapts one or more systems to provide a method of migrating carrier subscribers to service bundles, the computer readable medium comprising: code for obtaining a list of existing services to which a subscriber is subscribed; code for comparing the list of services to available service bundles; code for determining if there is an exact match of services between the list of existing services and services included in one or more available service bundles, and if so, migrating the subscriber to the one or more available service bundles with the exact match.

In an embodiment, the computer readable medium further comprises: code for identifying a main service in the list of existing services; code for determining if there is a partial match of services between the main service and a service included in one or more available service bundles, and if so, migrating the subscriber to the one or more available service bundles with the partial match.

In another embodiment, the computer readable medium further comprises code for defining a new service bundle if a subscriber cannot be migrated with an exact match or a partial match.

In another embodiment, the computer readable medium further comprises code for maintaining a supplier provisioning system database with assigned service bundle information for each subscriber.

In another embodiment, the computer readable medium further comprises code for maintaining in the supplier provisioning system database the available service bundles for each carrier.

In another embodiment, the computer readable medium further comprises code for provisioning services for each subscriber as determined by the subscriber's carrier's available service bundle.

In another aspect, there is provided a method of managing services for carrier subscribers on a supplier provisioning system, the method comprising: obtaining a list of services to which a subscriber is subscribed; identifying services to be designated as a main service; and for each main service, defining at least one service bundle containing a corresponding main service.

In an embodiment, the method further comprises maintaining a list of supplier defined service bundles on a supplier provisioning system; and maintaining for each carrier a list of carrier selected service bundles available to subscribers of that carrier, the list of carrier selected service bundles comprising at least a subset of the supplier defined service bundles.

In another embodiment, the method further comprises connecting the supplier provisioning system to at least one carrier subsystem; and receiving from the at least one carrier subsystem a request to provision one or more services for a subscriber of the carrier from the list of carrier selected service bundles.

In another embodiment, the method further comprises processing the request to provision one or more services by identifying at least one main service; and provisioning the one or more services by designating one or more of the supplier defined service bundles having the identified main service.

In another embodiment, the method further comprises connecting the supplier provisioning system and the at least one carrier subsystem via the Internet; and provisioning the one or more services by referencing the designated service bundle's XML name or names.

In another embodiment, the method further comprises adding new supplier defined service bundles on the supplier provisioning system as new services are introduced; and making these new supplier defined service bundles available for selection by each carrier for their subscribers.

In another aspect, there is provided a system for managing services for carrier subscribers on a supplier provisioning system, the method comprising: means for obtaining a list of services to which a subscriber is subscribed; means for identifying services to be designated as a main service; and means for defining for each main service at least one service bundle containing a corresponding main service.

In an embodiment, the system further comprises means for maintaining a list of supplier defined service bundles on a supplier provisioning system; and means for maintaining for each carrier a list of carrier selected service bundles available to subscribers of that carrier, the list of carrier selected service bundles comprising at least a subset of the supplier defined service bundles.

In another embodiment, the system further comprises means for connecting the supplier provisioning system to at least one carrier subsystem; and means for receiving from the at least one carrier subsystem a request to provision one or more services for a subscriber of the carrier from the list of carrier selected service bundles.

In another embodiment, the system further comprises means for processing the request to provision one or more services by identifying at least one main service; and means for provisioning the one or more services by designating one or more of the supplier defined service bundles having the identified main service.

In another embodiment, the system further comprises means for connecting the supplier provisioning system and the at least one carrier subsystem via the Internet; and means for provisioning the one or more services by referencing the designated service bundle's XML name or names.

In another embodiment, the system further comprises means for adding new supplier defined service bundles on the supplier provisioning system as new services are introduced; and means for making these new supplier defined service bundles available for selection by each carrier for their subscribers.

In another aspect, there is provided a computer readable medium storing computer code that when processed adapts one or more systems to provide a method of managing services for carrier subscribers on a supplier provisioning system, the computer readable medium comprising: code for obtaining a list of services to which a subscriber is subscribed; code for identifying services to be designated as a main service; and code for defining, for each main service, at least one service bundle containing a corresponding main service.

In an embodiment, the computer readable medium further comprises code for maintaining a list of supplier defined service bundles on a supplier provisioning system; and code for maintaining for each carrier a list of carrier selected service bundles available to subscribers of that carrier, the list of carrier selected service bundles comprising at least a subset of the supplier defined service bundles.

In another embodiment, the computer readable medium further comprises code for connecting the supplier provisioning system to at least one carrier subsystem; and code for receiving from the at least one carrier subsystem a request to provision one or more services for a subscriber of the carrier from the list of carrier selected service bundles.

In another embodiment, the computer readable medium further comprises code for processing the request to provision one or more services by identifying at least one main service; and code for provisioning the one or more services by designating one or more of the supplier defined service bundles having the identified main service.

In another embodiment, the computer readable medium further comprises code for connecting the supplier provisioning system and the at least one carrier subsystem via the Internet; and code for provisioning the one or more services by referencing the designated service bundle's XML name or names.

In another embodiment, the computer readable medium further comprises code for adding new supplier defined service bundles on the supplier provisioning system as new services are introduced; and code for making these new supplier defined service bundles available for selection by each carrier for their subscribers.

While illustrative embodiments have been described above, it will be appreciated that various changes and modifications may be made. More generally, the scope of the invention is defined by the following claims.

What is claimed is:

1. A method of migrating carrier subscribers to service bundles, comprising:
    obtaining a list of existing services provisioned to a subscriber;
    comparing the list of existing services provisioned to a subscriber to available service bundles;
    determining if there is an exact match of services between the list of existing services provisioned to a subscriber and services included in one or more of the available service bundles, and if so, migrating the subscriber to the one or more of the available service bundles with the exact match;
    identifying a main service in the list of existing services;
    determining if there is a partial match of services between the main service and a service included in one or more of the available service bundles, and if so, migrating the subscriber to the one or more of the available service bundles with the partial match; and
    defining a new service bundle if a subscriber cannot be migrated with an exact match or a partial match.

2. The method of claim 1, further comprising maintaining a supplier provisioning system database with assigned service bundle information for each subscriber.

3. The method of claim 1, further comprising maintaining in a supplier provisioning system database the available service bundles for each carrier.

4. The method of claim 3, further comprising provisioning services for each subscriber as determined by the subscriber's carrier's available service bundle.

5. A system for migrating carrier subscribers to service bundles, comprising:
    means for obtaining a list of existing services provisioned to a subscriber;
    means for comparing the list of existing services provisioned to a subscriber to available service bundles;
    means for determining if there is an exact match of services between the list of existing services provisioned to a subscriber and services included in one or more of the available service bundles, and if so, migrating the subscriber to the one or more of the available service bundles with the exact match;
    means for identifying a main service in the list of existing services;
    means for determining if there is a partial match of services between the main service and a service included in one or more of the available service bundles, and if so, migrating the subscriber to the one or more of the available service bundles; and
    means for defining a new service bundle if a subscriber cannot be migrated with an exact match or a partial match.

6. The system of claim 5, further comprising means for maintaining a supplier provisioning system database with assigned service bundle information for each subscriber.

7. The system of claim 5, further comprising means for maintaining in a supplier provisioning system database the available service bundles for each carrier.

8. The system of claim 7, further comprising means for provisioning services for each subscriber as determined by the subscriber's carrier's available service bundle.

9. A non-transitory computer readable medium storing computer code that when processed adapts one or more systems to provide a method of migrating carrier subscribers to service bundles, the computer readable medium comprising:
   code for obtaining a list of existing services provisioned to a subscriber;
   code for comparing the list of existing services provisioned to a subscriber to available service bundles;
   code for determining if there is an exact match of services between the list of existing services provisioned to a subscriber and services included in one or more of the available service bundles, and if so, migrating the subscriber to the one or more of the available service bundles with the exact match;
   code for identifying a main service in the list of existing services;
   code for determining if there is a partial match of services between the main service and a service included in one or more of the available service bundles, and if so, migrating the subscriber to the one or more of the available service bundles with the partial match; and
   code for defining a new service bundle if a subscriber cannot be migrated with an exact match or a partial match.

10. The non-transitory computer readable medium of claim 9, further comprising code for maintaining a supplier provisioning system database with assigned service bundle information for each subscriber.

11. The non-transitory computer readable medium of claim 9, further comprising code for maintaining in a supplier provisioning system database the available service bundles for each carrier.

12. The non-transitory computer readable medium of claim 11, further comprising code for provisioning services for each subscriber as determined by the subscriber's carrier's available service bundle.

* * * * *